(12) United States Patent
Fujimoto et al.

(10) Patent No.: US 7,993,428 B2
(45) Date of Patent: Aug. 9, 2011

(54) METHOD FOR MANUFACTURING MOLTEN IRON

(75) Inventors: Hideaki Fujimoto, Kobe (JP); Tsuyoshi Mimura, Kakogawa (JP); Itsuo Miyahara, Kobe (JP); Takao Harada, Kobe (JP); Masataka Tateishi, Kobe (JP); Hiroshi Sugitatsu, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/678,533

(22) PCT Filed: Sep. 18, 2008

(86) PCT No.: PCT/JP2008/066874
§ 371 (c)(1),
(2), (4) Date: Mar. 17, 2010

(87) PCT Pub. No.: WO2009/038139
PCT Pub. Date: Mar. 26, 2009

(65) Prior Publication Data
US 2010/0180723 A1    Jul. 22, 2010

(30) Foreign Application Priority Data
Sep. 19, 2007  (JP) .................................. 2007-242651

(51) Int. Cl.
*C21C 5/35* (2006.01)
*C21C 7/076* (2006.01)
*C21C 5/54* (2006.01)
*C21B 11/10* (2006.01)

(52) U.S. Cl. ...................... 75/10.45; 75/10.46; 75/10.61; 75/10.63; 65/20

(58) Field of Classification Search .................. 75/10.45, 75/10.61, 10.63, 10.46; 65/20
See application file for complete search history.

(56) References Cited

U.S. PATENT DOCUMENTS 4,076,954 A * 2/1978 Linder ........................ 75/10.38
(Continued)

FOREIGN PATENT DOCUMENTS

| JP | 50 134912 | 10/1975 |
|----|-----------|---------|
| JP | 61 213310 | 9/1986 |
| JP | 62 23848 | 2/1987 |
| JP | 62 125289 | 6/1987 |

(Continued)

OTHER PUBLICATIONS

Machine translation of JP 62247014 A published Oct. 1987.*

*Primary Examiner* — George Wyszomierski
*Assistant Examiner* — Tima M McGuthry-Banks
(74) *Attorney, Agent, or Firm* — Oblon, Spivak, McClelland, Maier & Neustadt, L.L.P.

(57) ABSTRACT

A method for manufacturing molten iron comprises charging a carbonaceous material, a flux, and solid reduced iron obtained by thermally reducing carbon composite iron oxide agglomerates into an arc melting furnace and melting the solid reduced iron using arc heating in the melting furnace while an inert gas is blown into a molten iron layer from a bottom blowing tuyere on a bottom of the melting furnace, wherein: a carbonaceous material suspending slag layer is formed in an upper portion of a slag layer formed on the molten iron layer when the solid reduced iron is melted into the molten iron; a carbonaceous material coating layer having the carbonaceous material is formed on the carbonaceous material suspending slag layer; and the molten iron and the slag stored in the melting furnace are tapped from a tap hole formed in a lower portion of a furnace wall of the melting furnace.

11 Claims, 2 Drawing Sheets

U.S. PATENT DOCUMENTS

| | | | |
|---|---|---|---|
| 4,087,274 A * | 5/1978 | Edenwall et al. | 75/10.17 |
| 4,098,603 A | 7/1978 | Roth et al. | |
| 4,699,654 A * | 10/1987 | Maddever et al. | 75/10.45 |
| 4,913,732 A | 4/1990 | Miyano et al. | |
| 5,078,785 A * | 1/1992 | Ibaraki et al. | 75/386 |
| 6,597,722 B2 * | 7/2003 | Mizukami et al. | 373/80 |
| 2003/0070507 A1 | 4/2003 | Tokuda et al. | |
| 2004/0168549 A1 | 9/2004 | Kobayashi et al. | |
| 2006/0021469 A1 | 2/2006 | Ito et al. | |

FOREIGN PATENT DOCUMENTS

| | | | |
|---|---|---|---|
| JP | 62 247014 | | 10/1987 |
| JP | 62247014 A | * | 10/1987 |
| JP | 2 93289 | | 4/1990 |
| JP | 2001 241859 | | 9/2001 |
| JP | 2003 105415 | | 4/2003 |
| JP | 2004 176170 | | 6/2004 |
| JP | 2004 183070 | | 7/2004 |
| JP | 2006 257545 | | 9/2006 |

* cited by examiner

METHOD FOR MANUFACTURING MOLTEN IRON

This application is a national stage entry of PCT/JP08/66874 filed Sep. 18, 2008.

TECHNICAL FIELD

The present invention relates to a method for manufacturing molten iron by melting solid reduced iron. Specifically, the present invention relates to a method for manufacturing molten iron by, in an arc melting furnace, melting solid reduced iron obtained by thermally reducing carbon composite iron oxide agglomerates in a rotary hearth furnace or the like.

BACKGROUND ART

The applicant of the present invention has proposed a molten iron manufacturing process, as a new iron making process that takes the place of a known blast-furnace process or smelting reduction process, achieved by combining a rotary hearth furnace in which solid reduced iron is produced by thermally reducing carbon composite iron oxide agglomerates composed of an iron oxide source and a carbonaceous reductant, with an iron bath furnace in which the solid reduced iron is melted using, as a heating source, the heat generated when a carbonaceous material is burned with top blowing oxygen gas (refer to Patent Documents 1 and 2). However, since a large amount of oxygen gas is consumed in the iron bath furnace in this process, molten iron cannot be manufactured stably if oxygen gas is not sufficiently supplied. Therefore, instead of the iron bath furnace, the development of a melting furnace that uses a heating source other than combustion heat has been required.

In the molten iron manufacturing process, since the solid reduced iron includes gangue contained in the iron oxide source and ash of the carbonaceous reductant, a large amount of molten slag (hereinafter may be simply referred to as "slag") is produced when the solid reduced iron is melted in a melting furnace. In particular, when, for example, electric furnace dust containing a large amount of slag component is used as the iron oxide source, 700 kg or more of slag or sometimes 1000 kg of slag per ton of molten iron is produced. Once such a large amount of slag is abnormally formed in the furnace, it is too late to remedy the situation. The slag forming causes the interruption of the operation and the slag brought into an exhaust gas system blocks the exhaust gas system. In addition, when slag is tapped, the slag is cooled and solidified because the slag whose weight is decreased due to its forming has small thermal capacity, whereby a tap hole may be blocked.

On the other hand, an example of a method for manufacturing molten steel by smelting solid reduced iron includes a method in which a large amount of solid reduced iron is blended with scraps and then smelted in a tilting electric arc furnace, and tapping of molten steel and tapping of molten slag are performed by tilting the furnace. The solid reduced iron used in this method is manufactured by reducing high-grade iron ore pellet and lump ore using a reducing gas obtained by modifying natural gas. The amount of molten slag produced in this method is about 100 to 150 kg per ton of molten steel, and the amount is much smaller than that produced in the molten iron manufacturing process. In this method, therefore, troubles caused by the slag forming and the solidification of slag during tapping of slag rarely occur and the slag forming and the solidification of slag are not problematic.

Thus, it is considered that molten iron is manufactured by this method with the solid reduced iron used in the molten iron manufacturing process, instead of the solid reduced iron used in this method. In this case, however, a large amount of molten slag is produced at the melting stage of the solid reduced iron, which increases the possibility of troubles caused by slag forming. In addition, since tapping of molten iron and slag needs to be performed by tilting a furnace in every charge, the molten iron flows out during tapping and heat radiation loss increases during tapping, which poses a problem in that the productivity of molten iron is reduced.

Another example of the method for manufacturing molten steel by smelting solid reduced iron includes a method in which molten steel is manufactured by smelting solid reduced iron in a submerged-arc furnace with a fixed furnace body using resistance heating from an electrode immersed in a slag layer, and molten steel and molten slag are intermittently discharged from a tap hole and a cinder notch disposed on the furnace side (e.g., refer to Patent Document 3).

In this method, tilting of a furnace is not necessary during tapping of molten steel and molten slag. Therefore, smelting can be continued even during tapping, but the productivity of this method is low because resistance heating is used. If the size of the furnace is increased to compensate for the low productivity, operating cost is increased due to an increase in power consumption and the cost of equipment is also increased.

An example of a method for preventing the blocking of a tap hole and a cinder notch caused by cooling of molten iron or slag includes a method in which the temperatures of a furnace bottom, a tap hole, and a cinder notch are increased by winding an induction coil on the bottom of a blast furnace or a blast furnace-type melting furnace to generate heat (refer to Patent Document 4).

However, in this method, an expensive induction heating apparatus is required to increase the temperature of slag, which not only increases the cost of equipment but also requires efforts for maintenance.

[Patent Document 1] Japanese Unexamined Patent Application Publication No. 2004-176170
[Patent Document 2] Japanese Unexamined Patent Application Publication No. 2006-257545
[Patent Document 3] Japanese Unexamined Patent Application Publication No. 50-134912
[Patent Document 4] Japanese Unexamined Patent Application Publication No. 2001-241859

DISCLOSURE OF INVENTION

In view of the problems described above, an object of the present invention is to provide a method for manufacturing molten iron in which solid reduced iron obtained by thermally reducing carbon composite iron oxide agglomerates is melted without abnormally generating slag forming in the furnace. In the method, the slag produced in the melting operation can be tapped with certainty without tilting a furnace.

The present invention provides a method for manufacturing molten iron including a step of charging a carbonaceous material, a flux, and solid reduced iron obtained by thermally reducing carbon composite iron oxide agglomerates into an arc melting furnace and melting the solid reduced iron using arc heating in the melting furnace while an inert gas is blown into a molten iron layer contained in the melting furnace from a bottom blowing tuyere disposed on a bottom of the melting furnace to stir the molten iron layer, wherein the carbonaceous material is charged so that a carbonaceous material suspending slag layer in which the carbonaceous material is suspended is formed in an upper portion of a slag layer formed on the molten iron layer by slag produced when the solid reduced iron is melted into the molten iron and so that a carbonaceous material coating layer composed of only the carbonaceous material is further formed on the carbonaceous material suspending slag layer, and the molten iron and the slag stored in the melting furnace are tapped from a tap hole formed in a lower portion of a furnace wall of the melting furnace.

An object, feature, aspect, and advantage of the present invention will become apparent with the following detailed description and the attached drawings.

BEST MODE FOR CARRYING OUT THE INVENTION

An arc melting furnace used in a method for manufacturing molten iron according to an embodiment of the present invention will now be described in detail with reference to the attached drawings. The method for manufacturing molten iron according to an embodiment of the present invention is described in detail by being divided into a step of forming a molten iron layer, a slag layer, and a carbonaceous material coating layer by charging solid reduced iron, a carbonaceous material, and a flux into the furnace and then by melting the solid reduced iron using arc heating (hereinafter may be referred to as "a melting step"); a step of tapping molten iron and slag produced in the melting step from the furnace (hereinafter may be referred to as "an iron/slag tapping step"); and a step of repairing the furnace (hereinafter may be referred to as "a repairing step").

[Structure of Arc Melting Furnace]

Figure 1:
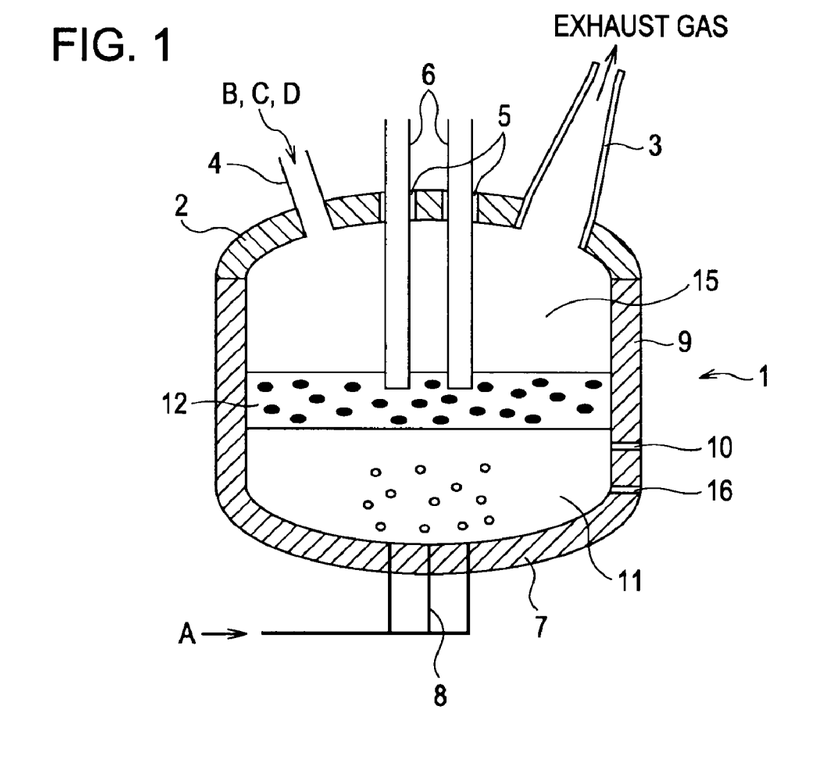
FIG. 1 is a longitudinal sectional view showing a general structure of an arc melting furnace according to an embodiment.

FIG. 1 shows a general structure of an arc melting furnace according to an embodiment of the present invention. An arc melting furnace (hereinafter may be simply referred to as "furnace") 1 according to this embodiment includes an exhaust gas duct 3 and a raw material charging chute 4 connected thereto through a furnace cover 2, electrodes 6 inserted thereinto through electrode holes 5 formed in the furnace cover 2, a plurality of bottom blowing tuyeres 8 disposed on a furnace bottom 7, and a tap hole 10 formed in the lower portion of a furnace wall 9, as in a known electric arc furnace for steelmaking. The raw material charging chute 4 is used for charging solid reduced iron B, a carbonaceous material C, and/or a flux D that are raw materials. The tap hole 10 is used for discharging molten iron (that is, tapping of molten iron) and for discharging slag (that is, tapping of slag). In the arc melting furnace 1, since arc generated between the electrodes 6 and molten metal is used as a principal heating source, oxygen gas does not need to be supplied to the furnace in order to obtain heat of combustion from a carbonaceous material. Furthermore, compared with a submerged-arc furnace in which a making current is limited to be low in accordance with the material of electrodes used, in the arc melting furnace 1 which is not severely limited by the material of electrodes used, the input energy can be increased by increasing an electric current value. Thus, the arc melting furnace 1 provides high productivity of molten iron.

A three-phase current electrode that has a good thermal efficiency and is commonly used in the electric arc furnace for steelmaking is particularly recommended as the electrodes 6.

A melting operation is preferably performed while the tips of the electrodes 6 are positioned (immersed) in a molten slag layer 12 described below. Consequently, the effects of the radiation heating due to arc and the resistance heating can be used at the same time, which can further facilitate melting.

[Melting Step]

The solid reduced iron B is obtained by thermally reducing carbon composite iron oxide agglomerates in a rotary hearth furnace (not shown). The solid reduced iron B is charged into the arc melting furnace 1 together with the carbonaceous material C such as coal and the flux D such as a CaO containing material including calcined lime and light burnt dolomite or a $SiO_2$ containing material including silica stone from the top of the arc melting furnace 1 through the raw material charging chute 4 that, for example, uses a gravity-based dropping method. The solid reduced iron B, the carbonaceous material C, and the flux D are charged into the furnace while an inert gas A such as nitrogen gas is blown into a molten iron layer 11 composed of molten iron stored in the arc melting furnace 1 as starting molten metal, from the plurality of bottom blowing tuyeres 8 to stir the molten iron layer 11. Arc heating is then performed using the electrodes 6. Molten iron 11 is manufactured by melting the solid reduced iron B using the arc as a heating source. At the same time, slag is also produced. Unreduced iron oxide (e.g., FeO) remains in the solid reduced iron B, and the unreduced iron oxide is reduced to iron (Fe) with a reaction $FeO+C \rightarrow Fe+CO$ using, as a reductant, carbon in the molten iron layer described below and a carbon component in the carbonaceous material C. Consequently, gas is emitted.

Solid reduced iron B can be obtained by thermally reducing carbon composite iron oxide agglomerates in a moving-bed type thermal reduction furnace such as a rotary hearth furnace. The carbon composite iron oxide agglomerates are obtained by agglomerating a powder mixture composed of an iron oxide source such as iron ore or steel plant dust and a carbonaceous reductant such as coal.

The solid reduced iron B may be charged into the arc melting furnace 1 in a hot state without substantially cooling the hot solid reduced iron manufactured in the rotary hearth furnace (not shown) or may be charged into the arc melting furnace 1 after the solid reduced iron B is manufactured in the rotary hearth furnace (not shown) and then cooled to a room temperature, in accordance with the distance between the installation sites of the rotary hearth furnace and the arc melting furnace 1. The metallization of the solid reduced iron B is preferably as high as possible to reduce the amount of the carbonaceous material consumed in the arc melting furnace 1, but, when the metallization is excessively high, the electrical conductivity of reduced iron excessively increases and thus the melting rate of the reduced iron becomes too high. Consequently, the carburizing amount to the produced molten iron and the desulfurization rate of the molten iron tend to be decreased. Thus, solid reduced iron B having a metallization of 60 to 95% is desirably used. The lower limit is preferably 80%, more preferably 90%.

Figure 2:
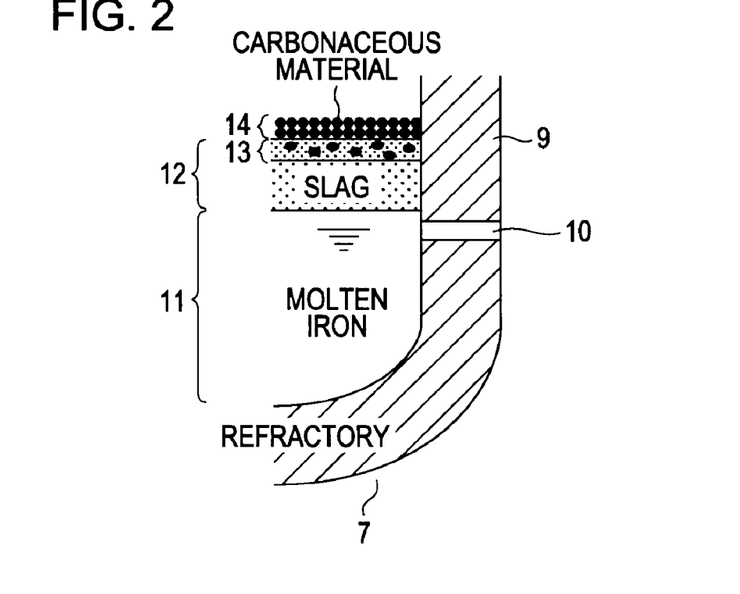
FIG. 2 is a longitudinal sectional view schematically showing the distribution of a carbonaceous material around a slag layer contained in the arc melting furnace.

In the method for manufacturing molten iron according to an embodiment of the present invention, a carbonaceous material suspending slag layer 13 in which part of the carbonaceous material C is suspended is formed in the upper portion of the molten slag layer 12 formed on the molten iron layer 11 and a carbonaceous material coating layer 14 composed of only the carbonaceous material C is further formed on the carbonaceous material suspending slag layer 13 as shown in a schematic view of FIG. 2 by adjusting the timing and amount of the carbonaceous material C charged.

By forming the carbonaceous material suspending slag layer 13 in the upper portion of the slag layer 12, the iron oxide concentration of slag contained in the carbonaceous material suspending slag layer 13 is decreased and the generation rate of air bubbles of carbon monoxide gas (hereinafter may be referred to as "CO air bubbles") that causes forming is decreased. Furthermore, the CO air bubbles are easily released from the slag layer 12 because of a carbonaceous material contained in the slag. Consequently, forming becomes not easily caused.

In addition, by forming the carbonaceous material coating layer 14 on the carbonaceous material suspending slag layer 13, the temperature of the slag layer 12 is kept by the carbonaceous material coating layer 14. Therefore, slag can be prevented from being cooled and solidified in the tap hole 10 during tapping of slag. Thus, tapping of slag can be performed smoothly and promptly without tilting the furnace, which can provide a method for manufacturing molten iron with high stability and productivity.

To achieve the advantages described above with more certainty, before the solid reduced iron B and the flux D are charged, only the carbonaceous material C is preferably charged into the arc melting furnace 1 in which molten iron is stored as starting molten metal. This is because, at the early melting stage of the solid reduced iron B, the carbonaceous material C that is present on the molten iron layer 11 is immediately suspended in the upper portion of the molten slag layer 12 and forms the carbonaceous material suspending slag layer 13 with more certainty.

To achieve the advantages described above with more certainty, when molten iron starts to come out (tapping of molten iron), the total amount (that is, the amount of carbonaceous material left in the furnace) of a carbonaceous material in the carbonaceous material suspending slag layer 13 and a carbonaceous material of the carbonaceous material coating layer 14 is preferably 100 to 300 kg per 1000 kg of slag contained in the molten slag layer 12. When the total amount is 100 kg or more, the carbonaceous material content in the carbonaceous material suspending slag layer 13 is increased and the carbonaceous material coating layer 14 is thickened, which increases the effects of the forming prevention and the smooth and prompt tapping of slag. On the other hand, when the total amount is 300 kg or less, the carbonaceous material of the carbonaceous material coating layer 14 is not aggregated by heating. Therefore, the slag layer 12 is sufficiently stirred and the melting rate of the solid reduced iron B into the molten iron layer 11 does not decrease. More preferably, the total amount of the carbonaceous materials is 200 to 300 kg per 1000 kg of slag contained in the molten slag layer 12.

Herein, the amount of carbonaceous material left in the furnace can be calculated by, for example, subtracting the total amount obtained by adding the amount of carbonaceous material consumed for the reduction of unreduced iron oxide contained in the solid reduced iron, the amount of carbonaceous material consumed for the carburization to the produced molten iron, and the amount of carbonaceous material that flies into exhaust gas as dust, from the amount of carbonaceous material charged into the furnace. The amount of slag contained in the molten slag layer 12 can be calculated by, for example, subtracting the discharged amount of slag from the produced amount of slag obtained from the gangue content in the solid reduced iron, the ash content in the carbonaceous material, and the amount of flux.

In addition to coal, for example, coke, oil coke, charcoal, woodchip, plastic waste, used tire, and a bedding carbonaceous material (including charred material) used in the rotary hearth furnace can be charged as the carbonaceous material C. These materials may be used alone or in combination.

In addition to the CaO containing material, silica stone that is a $SiO_2$ containing material has been exemplified as the flux D. This is because, when electric furnace dust containing a large amount of CaO is used as an iron oxide source, a $SiO_2$ source needs to be added to adjust the basicity of slag.

In consideration of formation of the carbonaceous material suspending slag layer and the carbonaceous material coating layer or in consideration of adjustments of molten iron/slag components and temperature, various raw materials are preferably charged while the solid reduced iron B is melted.

The flow rate of bottom blowing nitrogen gas (inert gas A) may be adjusted to 0.01 to 0.20 $Nm^3$/min per ton of molten iron contained in the molten iron layer 11 to achieve a stable melting rate of the solid reduced iron B through sufficient stirring of the molten iron layer 11.

To facilitate the desulfurization from molten iron while the fluidity of the slag layer 12 is ensured, the basicity $CaO/SiO_2$ (mass ratio) of the slag layer 12 is adjusted to 0.8 to 2.0, preferably 1.0 to 1.6 (refer to Examples described below and FIG. 3).

The content of carbon in molten iron is preferably 3% or higher by mass, more preferably 3.5 to 4.5% by mass. The content of iron of slag contained in the slag layer 12 is preferably 5% or lower by mass, more preferably 3% or lower by mass. Thus, the desulfurization from the molten iron layer 11 is facilitated while the loss in melting of a lined refractory caused by molten iron oxide is suppressed.

[Iron/Slag Tapping Step]

By continuing the melting operation for a certain time as described above, a certain amount (e.g., the amount of a single tapping) of iron and slag is stored in the arc melting furnace 1. The tapping of iron and slag is then performed. As with the tapping of iron and slag in a blast furnace, a tap hole 10 is opened using a drill and molten iron is then discharged until the bath level reaches the level of the tap hole 10, while the furnace is stood upright without tilting it. Subsequently, slag is discharged. The tap hole 10 is heated by discharging molten iron having high thermal capacity first. Consequently, even if slag is discharged after that, the tap hole 10 can be prevented from being blocked by the solidification of slag. To prevent the solidification of slag with more certainty, the tapping temperature is set to be 1400° C. or higher, preferably 1450° C. or higher (refer to Examples described below and FIG. 4). However, if the tapping temperature is excessively increased, wasteful energy is consumed and the erosion rate of a lined refractory is also increased. Thus, the tapping temperature is preferably 1550° C. or lower.

To prevent slag forming with more certainty, the height of freeboard 15 is adjusted such that the thickness of the molten slag layer 12 is ⅕ or less of the height of the freeboard, and the cycle time of tapping of iron and slag is preferably determined in accordance with the height.

Furthermore, since the presence of the carbonaceous material suspending slag layer 13 prevents the forming of slag and thus the density of slag is kept high in the furnace, the thermal capacity of slag is kept high during the tapping of slag. In addition, since the presence of the carbonaceous material coating layer 14 keeps the temperature of slag in the furnace, slag is prevented from being cooled and solidified during tapping of slag even if arc heating is stopped or lowered.

The tapping of slag is ended when a carbonaceous material starts to come out from the tap hole 10 together with slag, that is, when the carbonaceous material suspending slag layer 13 starts to come out. At that moment, the tap hole is blocked using mud.

Since the carbonaceous material suspending slag layer 13 and the carbonaceous material coating layer 14 are left in the furnace, slag forming is prevented and the effect of temperature keeping is maintained in the next melting operation.

By repeating the method for manufacturing molten iron according to an embodiment of the present invention, the tapping of slag can be repeatedly performed smoothly and promptly while slag forming is prevented. Since the tapping of iron and slag can be performed while the furnace is stood upright without tilting it, the melting operation can be continued even during the tapping of iron and slag. Accordingly, the method for manufacturing molten iron according to an embodiment of the present invention can provide high productivity of molten iron.

[Repairing Step]

In the method for manufacturing molten iron according to an embodiment of the present invention, the bottom blowing tuyeres 8 are used, and thus the clogging or loss in melting of the tuyeres 8, erosion of a refractory on the furnace bottom around the tuyeres 8, or the like is caused. This requires regular inspection and repair work. Therefore, as in a known electric arc furnace for steelmaking, an end tap hole 16 is formed in the lowest portion of the side face of the arc melting furnace 1. The arc melting furnace 1 is tilted by 20° or less to discharge the remaining iron and slag from the end tap hole 16, for example, once per several days. After the furnace is emptied, regular inspection and repair work are preferably carried out.

When the furnace is restarted after the regular inspection and repair work, the remaining iron that has been discharged from the furnace before the regular inspection and repair work and stored in another ladle or the like to keep its temperature may be charged into the furnace again as starting molten metal. Although slag and skull adhere to the surface of a lined refractory when the remaining iron and slag are discharged, the surface is coated with a carbonaceous material of the carbonaceous material suspending slag layer 13 and a carbonaceous material in the carbonaceous material coating layer 14. Therefore, even if the furnace is heated using a burner to keep the temperature during the inspection and repair work, the oxidation of the slag and skull is prevented. Consequently, bumping caused when starting molten metal for restarting is charged or slag forming in the next blowing can be prevented.

(Modification)

In the embodiment described above, the case where the tap hole 10 is formed in only a single location has been exemplified, but a plurality of tap holes 10 are preferably formed in a height direction such that the reduction in the bottom surface level of the furnace caused by loss in melting of a refractory and the change of the cycle time for tapping of iron and slag can be handled. Alternatively, a plurality of tap holes 10 are preferably formed in the circumference direction of the furnace horizontally. For example, the tap holes 10 may be formed in directions of 180°, 90°, and 120°.

In the embodiment described above, the case where the solid reduced iron B is manufactured in the rotary hearth furnace has been exemplified, but the solid reduced iron B may be manufactured in a linear hearth furnace or a rotary kiln.

In the embodiment described above, the case where the carbonaceous material C and the flux D are charged into the furnace using the gravity-based dropping method has been exemplified, but they can be pulverized and directly blown into the slag layer, for example. However, the gravity-based dropping method is preferred to reduce the cost of equipment and the operating cost.

In the embodiment described above, the case where nitrogen gas ($N_2$) is used as a bottom blowing inert gas A has been exemplified, but argon gas (Ar), carbon monoxide gas (CO), carbon dioxide gas ($CO_2$), or a mixed gas thereof can be used.

EXAMPLES

Although a confirmatory test that uses an arc melting furnace has not been carried out because of equipment conditions, a test in which solid reduced iron is melted in a stationary furnace (the inner diameter of a refractory: 2 m and the effective height of the furnace: 2.6 m) using, as a heating source, the heat generated when a carbonaceous material is burned with top blowing oxygen gas was performed to infer the forming behavior of slag and the slag tapping performance in an arc melting furnace. In both of the arc melting furnace and the stationary furnace, when reduced iron including iron oxide is melted in a molten iron layer or a slag layer, oxygen atoms included in iron oxide are emitted as carbon monoxide gas and carbon dioxide gas through slag. It is believed that a large amount of carbon monoxide gas and carbon dioxide gas is generated in the case where heat of combustion of a carbonaceous material is used as a heating source compared with the case where arc heating is used as a heating source, but, in both the heating methods, the molten iron layer and the slag layer in the furnace show substantially the same behavior when reduced iron is melted.

Solid reduced irons each having a composition shown in Table 1 were used as solid reduced iron. Each of the solid reduced irons was obtained by thermally reducing a carbon composite iron oxide pellet whose iron oxide source is steel plant dust in a rotary hearth furnace and then by cooling it to a room temperature. Coke breeze and anthracite each having a composition shown in Table 2 were used as a carbonaceous material. Calcined lime and dolomite were used as a flux. Nitrogen gas was used as a bottom blowing inert gas and oxygen gas was used as a top blowing oxygen-containing gas.

TABLE 1

| Item | Unit | Reduced iron (1) | Reduced iron (2) | Reduced iron (3) | Reduced iron (4) |
|---|---|---|---|---|---|
| Grain size | | +6.7 mm 75% | +6.7 mm 93% | +3.35 mm 64% | +3.35 mm 65% |
| Component | | | | | |
| T. Fe | mass % | 75.6 | 81.1 | 58.1 | 35.4 |
| FeO | mass % | 8.0 | 16.8 | 13.2 | 12.2 |
| Gangue | mass % | 6.8 | 7.1 | 23.8 | 36.3 |
| C | mass % | 10.5 | 4.2 | 7.2 | 3.1 |
| S | mass % | 0.13 | 0.08 | 0.6 | 0.6 |
| Metallization | % | 91.8 | 83.9 | 82.4 | 73.2 |

TABLE 2

| Item | Unit | Coke breeze | Anthracite |
|---|---|---|---|
| Grain size | | +12 mm | +6 mm |
| Proximate analysis | | | |
| Volatile component | mass % | 0.5 | 6.6 |
| Ash | mass % | 12.8 | 13.9 |
| Fixed carbon | mass % | 86.7 | 79.5 |
| Ultimate analysis | | | |
| C | mass % | 85.1 | 81.5 |
| H | mass % | 0.1 | 1.3 |
| N | mass % | 1.1 | 0.3 |
| O | mass % | 0.4 | 3.0 |
| S | mass % | 0.6 | 0.2 |

Example 1

When a furnace was started, after starting molten metal and then a predetermined amount of carbonaceous material were charged into the stationary furnace, raw materials (reduced irons (1) and (2) shown in Table 1, carbonaceous material, and flux) were charged and blowing was started. Subsequently, a carbonaceous material suspending slag layer and a carbonaceous material coating layer were formed in the furnace to control melting and tapping of iron and slag. In this Example, the tapping temperature was 1568° C., the basicity of slag ($CaO/SiO_2$) was 1.28, and the coefficient of slag tapping was 1.66.

Example 2

As in Example 1, after raw materials were charged and blowing was started, a carbonaceous material suspending slag layer and a carbonaceous material coating layer were formed in the furnace to control melting and tapping of iron and slag, except that the amount of carbonaceous material charged was changed. In this Example, the tapping temperature was 1489° C., the basicity of slag ($CaO/SiO_2$) was 0.91, and the coefficient of slag tapping was 1.65.

Example 3

As in Example 1, after raw materials were charged and blowing was started, a carbonaceous material suspending slag layer and a carbonaceous material coating layer were formed in the furnace to control melting and tapping of iron and slag, except that the reduced irons were changed to the reduced irons (1), (2), and (3) shown in Table 1. In this Example, the tapping temperature was 1551° C., the basicity of slag ($CaO/SiO_2$) was 0.89, and the coefficient of slag tapping was 1.38.

Example 4

As in Example 1, after raw materials were charged and blowing was started, a carbonaceous material suspending slag layer and a carbonaceous material coating layer were formed in the furnace to control melting and tapping of iron and slag, except that the reduced irons were changed to the reduced iron (4) shown in Table 1. In this Example, the tapping temperature was 1529° C., the basicity of slag ($CaO/SiO_2$) was 0.94, and the coefficient of slag tapping was 1.81.

Comparative Example 1

When a furnace was restarted, after starting molten metal was charged into the stationary furnace, raw materials (reduced iron (3) shown in Table 1, carbonaceous material, and flux) were charged and blowing was started. Only the amount of carbonaceous material required for melting the reduced iron was charged into the furnace. The melting and tapping of iron and slag were controlled by adjusting only the basicity of slag and the tapping temperature. In this Comparative Example, the tapping temperature was 1503° C., the basicity of slag ($CaO/SiO_2$) was 0.97, and the coefficient of slag tapping was 0.85.

Comparative Example 2

As in Comparative Example 1, raw materials were charged and blowing was started, and the melting and tapping of iron and slag were controlled by adjusting only the basicity of slag and the tapping temperature, except that the reduced iron was changed to the reduced irons (3) and (4) shown in Table 1. Only the amount of carbonaceous material required for melting the reduced irons was charged into the furnace. In this Comparative Example, the tapping temperature was 1518° C., the basicity of slag ($CaO/SiO_2$) was 1.26, and the coefficient of slag tapping was 1.00.

Comparative Example 3

As in Comparative Example 1, raw materials were charged and blowing was started, and the melting and tapping of iron and slag were controlled by adjusting only the basicity of slag and the tapping temperature, except that the reduced iron was changed to the reduced iron (4) shown in Table 1. Only the amount of carbonaceous material required for melting the reduced iron was charged into the furnace. In this Comparative Example, the tapping temperature was 1543° C., the basicity of slag ($CaO/SiO_2$) was 1.06, and the coefficient of slag tapping was 1.05.

In Examples and Comparative Examples, the secondary combustion ratio was controlled during melting so as to be in a range of 20 to 30%. The secondary combustion ratio is a value calculated from the amounts of gas components emitted from the furnace using the following formula.

$$\text{Secondary combustion ratio} = 100 \times (CO_2 + H_2O)/(CO + CO_2 + H_2 + H_2O)$$

In Examples 1 to 4, during the 8-hour continuous operation, the operation could be stably continued without experiencing any trouble caused by slag forming. In contrast, in Comparative Examples 1 to 3, a carbonaceous material suspending slag layer and a carbonaceous material coating layer were not formed in the furnace until the tapping of iron and slag because the amount of carbonaceous material charged was small. Furthermore, in Comparative Examples 1 to 3, a trouble such as blocking of an exhaust gas system caused by slag forming was developed within 10 to 15 minutes after blowing was started, which forced a shutdown of the operation.

Figure 3:
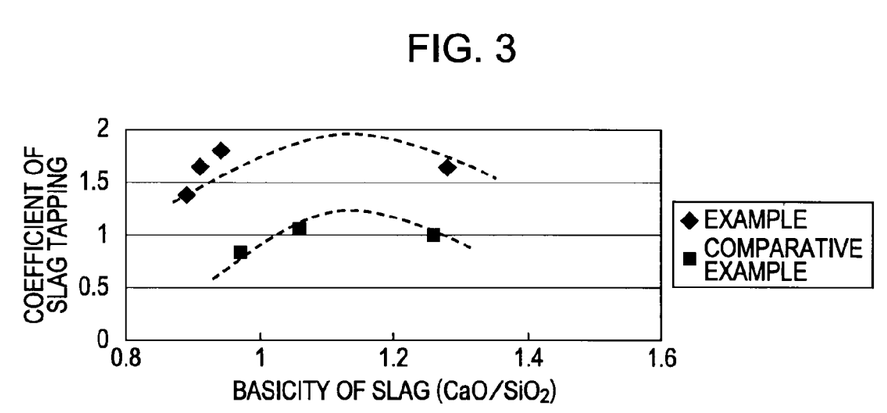
FIG. 3 is a graph showing a relationship between basicity of slag and coefficient of slag tapping.
Figure 4:
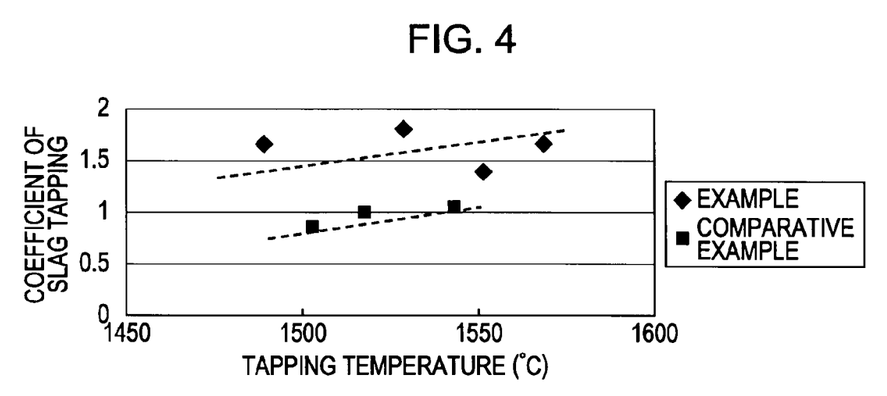
FIG. 4 is a graph showing a relationship between tapping temperature and coefficient of slag tapping.

As evident from FIGS. 3 and 4, in Comparative Examples 1 to 3, the coefficient of slag tapping (that is, a mass ratio of the amount of slag tapped to the amount of slag produced) was at most as low as about 1.1 even if the basicity of slag and the tapping temperature were adjusted. In contrast, in Examples 1 to 4, a high coefficient of slag tapping of 1.7 to 1.8 was obtained by appropriately adjusting the basicity of slag and the tapping temperature.

As described above in detail, the present invention provides a method for manufacturing molten iron including a step of charging a carbonaceous material, a flux, and solid reduced iron obtained by thermally reducing carbon composite iron oxide agglomerates into an arc melting furnace and melting the solid reduced iron using arc heating in the melting furnace while an inert gas is blown into a molten iron layer contained in the melting furnace from a bottom blowing tuyere disposed on a bottom of the melting furnace to stir the molten iron layer, wherein the carbonaceous material is charged so that a carbonaceous material suspending slag layer in which the carbonaceous material is suspended is formed in an upper portion of a slag layer formed on the molten iron layer by slag produced when the solid reduced iron is melted into the molten iron and so that a carbonaceous material coating layer composed of only the carbonaceous material is further formed on the carbonaceous material suspending slag layer, and the molten iron and the slag stored in the melting furnace are tapped from a tap hole formed in a lower portion of a furnace wall of the melting furnace.

In the present invention, an arc melting furnace including a tap hole in a lower portion of a furnace wall is utilized with stirring using bottom blowing gas, and a carbonaceous material is charged so that a carbonaceous material suspending slag layer in which the carbonaceous material is suspended is formed in an upper portion of a slag layer composed of slag, the slag layer being formed on a molten iron layer contained in the furnace, and so that a carbonaceous material coating layer composed of only the carbonaceous material is further formed on the carbonaceous material suspending slag layer. This decreases the iron oxide concentration of slag contained in the carbonaceous material suspending slag layer formed in the upper portion of the slag layer, which decreases the generation rate of air bubbles of carbon monoxide gas that causes forming. Furthermore, the carbonaceous material suspended in the carbonaceous material suspending slag layer improves the gas permeability of the carbon monoxide gas in the slag (that is, the air bubbles of carbon monoxide gas are easily released from the slag layer). Consequently, forming becomes not easily caused. In addition, the carbonaceous material coating layer formed on the carbonaceous material suspending slag layer keeps the temperature of the slag layer to prevent the cooling and solidification of slag in the tap hole during tapping of slag. Therefore, the tapping of slag can be performed smoothly and promptly without tilting the furnace, that is, while the furnace is stood upright. As a result, there can be provided a method for manufacturing molten iron with high stability and productivity at low cost.

In the method for manufacturing molten iron, a predetermined amount of the carbonaceous material is preferably charged first among the solid reduced iron, the carbonaceous material, and the flux. By charging a predetermined amount of the carbonaceous material first before the solid reduced iron is charged into the arc melting furnace, the carbonaceous material suspending slag layer becomes easily formed from an early stage of melting. Thus, slag forming can be prevented with more certainty.

In the method for manufacturing molten iron, the carbonaceous material is preferably charged such that the total amount of the carbonaceous material in the carbonaceous material suspending slag layer and the carbonaceous material of the carbonaceous material coating layer is 100 to 300 kg per 1000 kg of the slag contained in the slag layer when tapping of molten iron is started. By adjusting the amount of the carbonaceous material charged within the range, a decrease in the melting rate of the solid reduced iron and the generation of slag forming can be prevented with more certainty and the tapping of slag can be performed more smoothly and promptly.

In the method for manufacturing molten iron, the blow rate of the inert gas is preferably 0.01 to 0.20 Nm$^3$/min per ton of the molten iron contained in the molten iron layer. By adjusting the blow rate of the inert gas within the range, a stable melting rate of the solid reduced iron can be achieved through sufficient stirring of the molten iron layer.

In the method for manufacturing molten iron, the metallization of the solid reduced iron is preferably 60 to 95%. By using the solid reduced iron whose metallization is within the range, molten iron having a relatively high carbon concentration can be produced with a relatively small amount of carbonaceous material charged and a high desulfurization rate of molten iron can be achieved.

In the method for manufacturing molten iron, the iron content of the slag contained in the slag layer is preferably 5% or lower by mass. By adjusting the iron content of the slag within the range, the desulfurization from the molten iron layer can be further facilitated and the loss in melting of a lined refractory caused by molten iron oxide can be further suppressed.

In the method for manufacturing molten iron, the basicity of the slag ($CaO/SiO_2$) is preferably 0.8 to 2.0. By adjusting the basicity of the slag ($CaO/SiO_2$) within the range, the fluidity of the slag layer can be further increased and the desulfurization from the molten iron can be further facilitated.

In the method for manufacturing molten iron, the temperature (tapping temperature) of the molten iron at the time of tapping is preferably of 1400 to 1550° C. By adjusting the tapping temperature of the molten iron within the range, the operation can be performed with a higher energy efficiency and the erosion rate of the lined refractory can be further suppressed.

In the method for manufacturing molten iron, the tip of an electrode disposed in the melting furnace is preferably positioned in the slag layer. By positioning the tip in the slag layer, the effects of the radiation heating from arc and the resistance heating can be used at the same time, which can further facilitate melting.

In the method for manufacturing molten iron, the tapping of the slag is preferably ended when the carbonaceous material starts to come out from the tap hole together with the slag. By ending the tapping of the slag when the carbonaceous material starts to come out, the carbonaceous material suspending slag layer and the carbonaceous material coating layer are left in the furnace. Consequently, the prevention of slag forming and the temperature keeping of the slag can be performed with more certainty in the next manufacturing of molten iron.

In the method for manufacturing molten iron, the melting furnace preferably includes an end tap hole in the lowest portion of the furnace wall, and the melting furnace is preferably repaired after remaining iron and slag are tapped from the end tap hole by tilting the melting furnace by 20° or less. Since the erosion of a tuyere or a furnace wall of the melting furnace is repaired after the remaining iron and slag are tapped from the end tap hole by slightly tilting the melting furnace, the installation space of the furnace required for tilting can be saved and the time required for tilting can be shortened compared with the case where the furnace is steeply tilted.

INDUSTRIAL APPLICABILITY

With the method for manufacturing molten iron of the present invention, molten iron can be stably manufactured at low cost without abnormally generating slag forming in a furnace.

The invention claimed is:

1. A method for manufacturing molten iron comprising charging a carbonaceous material, a flux, and solid reduced iron obtained by thermally reducing carbon composite iron oxide agglomerates into an arc melting furnace and melting the solid reduced iron using arc heating in the melting furnace while an inert gas is blown into a molten iron layer contained in the melting furnace from a bottom blowing tuyere disposed on a bottom of the melting furnace to stir the molten iron layer, wherein the carbonaceous material is charged so that a carbonaceous material suspending slag layer in which the carbonaceous material is suspended is formed in an upper portion of a slag layer formed on the molten iron layer by slag produced when the solid reduced iron is melted into the molten iron and so that a carbonaceous material coating layer composed of only the carbonaceous material is further formed on the carbonaceous material suspending slag layer, and the molten iron and the slag stored in the melting furnace are tapped from a tap hole formed in a lower portion of a furnace wall of the melting furnace.

2. The method for manufacturing molten iron according to claim 1, wherein a predetermined amount of the carbonaceous material is charged first among the solid reduced iron, the carbonaceous material, and the flux.

3. The method for manufacturing molten iron according to claim 1, wherein the carbonaceous material is charged such that the total amount of the carbonaceous material in the carbonaceous material suspending slag layer and the carbonaceous material of the carbonaceous material coating layer is 100 to 300 kg per 1000 kg of the slag contained in the slag layer when tapping of molten iron is started.

4. The method for manufacturing molten iron according to claim 1, wherein a blow rate of the inert gas is 0.01 to 0.20 Nm$^3$/min per ton of the molten iron contained in the molten iron layer.

5. The method for manufacturing molten iron according to claim 1, wherein a metallization of the solid reduced iron is 60 to 95%.

6. The method for manufacturing molten iron according to claim 1, wherein an iron content of the slag contained in the slag layer is 5% or lower by mass.

7. The method for manufacturing molten iron according to claim 1, wherein a basicity of the slag is 0.8 to 2.0.

8. The method for manufacturing molten iron according to claim 1, wherein the temperature of the molten iron at the time of tapping is 1400 to 1550° C.

9. The method for manufacturing molten iron according to claim 1, wherein a tip of an electrode disposed in the melting furnace is positioned in the slag layer.

10. The method for manufacturing molten iron according to claim 1, wherein the tapping of the slag is ended when the carbonaceous material starts to come out from the tap hole together with the slag.

11. The method for manufacturing molten iron according to claim 1,
wherein the melting furnace includes an end tap hole in the lowest portion of the furnace wall, and
the melting furnace is repaired after remaining iron and slag are tapped from the end tap hole by tilting the melting furnace by 20° or less.

* * * * *